(12) United States Patent
Maeyama et al.

(10) Patent No.: US 8,839,721 B2
(45) Date of Patent: Sep. 23, 2014

(54) BOGIE FOR GUIDE RAIL TYPE VEHICLE

(75) Inventors: Hiroyuki Maeyama, Mihara (JP); Yoshinori Mitsui, Mihara (JP); Kousuke Katahira, Kawasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 105 days.

(21) Appl. No.: 13/202,193

(22) PCT Filed: Aug. 7, 2009

(86) PCT No.: PCT/JP2009/064322
§ 371 (c)(1),
(2), (4) Date: Sep. 15, 2011

(87) PCT Pub. No.: WO2010/095291
PCT Pub. Date: Aug. 26, 2010

(65) Prior Publication Data
US 2012/0000391 A1 Jan. 5, 2012

(30) Foreign Application Priority Data

Feb. 20, 2009 (JP) .................................. 2009-038664

(51) Int. Cl.
*B62D 1/26* (2006.01)
*B61F 9/00* (2006.01)
(52) U.S. Cl.
CPC .. *B62D 1/265* (2013.01); *B61F 9/00* (2013.01)
USPC ....................................................... 105/215.2
(58) Field of Classification Search
USPC ............. 105/215.2, 77.2, 165, 167, 168, 144, 105/199.1; 104/242, 243, 245, 246, 247, 104/119
See application file for complete search history.

(56) References Cited

U.S. PATENT DOCUMENTS 3,077,165 A * 2/1963 Vittorelli ........................ 104/247
3,853,069 A * 12/1974 Goodwin ....................... 180/401

(Continued)

FOREIGN PATENT DOCUMENTS

| JP | S51-18687 | 6/1976 |
| JP | U-S57-81957 | 10/1980 |

(Continued)

OTHER PUBLICATIONS

Overview of the 7200 series Yurikamome, Mar. 1999.

(Continued)

*Primary Examiner* — Mark Le
(74) *Attorney, Agent, or Firm* — Manabu Kanesaka; Benjamin Hauptman; Kenneth Baerner

(57) ABSTRACT

A bogie for a vehicle guided by guide wheels rotating while contacting a guide rail arranged along a guideway of the vehicle has a steering mechanism which operates in conjunction with the guide wheels to steer running wheels; a guide frame including a pair of traverse beams each of which is equipped with the guide wheels rotatably on both ends thereof and connecting members connecting the pair of the traverse beams with each other, the traverse beams being respectively arranged on a front side and a rear side of the bogie; a connection rod connecting the steering mechanism to the guide frame to move the steering mechanism in conjunction with the guide frame and steer the running wheels; and a turning bearing having a circular or an arc shape to rotatably support the guide frame on an axle of the bogie or a supporting member of the axle.

13 Claims, 6 Drawing Sheets

(56) References Cited

U.S. PATENT DOCUMENTS

| | | | | |
|---|---|---|---|---|
| 4,223,611 | A | * | 9/1980 | Dawson et al. ............... 104/247 |
| 4,265,180 | A | * | 5/1981 | Uozumi ........................ 104/247 |
| 6,477,963 | B1 | * | 11/2002 | Weule et al. .................. 180/401 |
| 2008/0083345 | A1 | | 4/2008 | Morita et al. |

FOREIGN PATENT DOCUMENTS

| | | |
|---|---|---|
| JP | S58-81857 | 5/1983 |
| JP | S63-28822 | 6/1988 |
| JP | U-H01-147164 | 10/1989 |
| JP | H02-91070 U | 7/1990 |
| JP | H05-22626 | 3/1993 |
| JP | H11-278004 | 10/1999 |
| JP | 2001-048008 | 2/2001 |
| JP | 3188939 | 7/2001 |
| JP | 2003-104198 | 4/2003 |
| JP | 2003-146204 | 5/2003 |
| JP | 2004-108978 | 4/2004 |
| JP | 3688461 | 8/2005 |
| JP | 2006-306334 | 11/2006 |
| JP | 2008-68829 | 3/2008 |

OTHER PUBLICATIONS

Korean Patent Office, "Office Action for KR 2011-7019211", Feb. 8, 2013.
PCT, International Preliminary Report on Patentability and Written Opinion, Sep. 13, 2011.
Korean Patent Office, "Decision for Grant of Patent for KR 10-2011-7019211", Sep. 2, 2013.
China Patent Office, "Notice of Allowance for CN 200980157147.9," Jul. 21, 2014.

* cited by examiner

BOGIE FOR GUIDE RAIL TYPE VEHICLE

RELATED APPLICATIONS

The present application is National Phase of International Application No. PCT/JP2009/064322 filed Aug. 7, 2009, and claims priority from, Japanese Application No. 2009-038664, filed Feb. 20, 2009.

BACKGROUND OF THE INVENTION

1. Field of the Invention

The present invention relates to a bogie for a guide rail type vehicle in which guide wheels roll along a guide rail while being in contact with the guide rail arranged along a guideway thereof so as to drive the vehicle.

2. Description of the Related Art

A new transportation system as a medium-capacity transportation using rubber tires traveling on a special guideway such as a new transit system and MRT, has become popular in recent years. This transportation system is usually fully automated. In some cases, the transportation system is equipped with guide wheels being guided on a guideway.

As one type of the new transit system, there is a vehicle which comprises a pair of front guide wheels which are connected to front rubber tires of a front part of the bogie via a steering mechanism and a pair of rear guide wheels being connected to rear rubber tires of a rear part of the bogie via the steering mechanism so as to steer the front rubber tires and the rear rubber tires by the front guide wheels and the rear guide wheels respectively. For instance, JP5-22626A discloses a vehicle of this type of the new transit system.

In this type of vehicle, the steering direction of the rubber tires has to be changed into a new direction every time the traveling direction is changed or reversed. Therefore, the vehicle is usually equipped with a forward/backward-changeover device for switching the traveling direction forward or backward and the traveling direction is changed at a terminal station by switching the forward/backward-changeover device. The switching device is complex in structure and has many wear components, which requires frequent and time-consuming maintenance.

To take measure against this, a bogie for a guide-rail type vehicle is proposed in which instead of the forward/backward-changeover device, a pair of guide frames are provided for each bogie and a pair of guide wheels are provided on each of the guide frames.

For instance, one type of the above vehicles is disclosed in Non-Patent Document 1 (March issue of "Railroad Vehicles and Technique" published in 1999, pp. 9-19) discloses a variety of vehicles of this type. The bogie comprises a pair of guide frames, each of which has two guide wheels at both ends thereof, an axle, and a suspension frame connected to the axle via a parallel link mechanism. The bogie is disposed under the vehicle via a turning bearing of a ring shape. Thus, the guide frame, the axle and the rubber tires are firmly connected and the entire bogie turns along with the guide wheels guided on a guide rail.

This type of vehicle is also disclosed in FIG. 4 of Patent Document 1, JP11-278004A and in FIG. 4 to FIG. 6 of Patent Document 2, JP2003-146204A.

The bogie disclosed in Patent Document 1 and Patent Document 2 is structured such that the guide frame, kingpins and the rubber tires are integrally coupled and the guide frame and the rubber tires rotate around the kingpin when the guide wheels receive the force in a width direction with respect to the guide rail.

The bogie disclosed in Non Patent Document 1, rotates around the turning bearing of a ring shape by the side-to-side force that the guide wheels receive from the guide rail. Thus, the load on the guide wheels is high and the durability of the guide wheels becomes short.

And, the guide frame and the rubber tires are rigidly connected and thus, the uneven surface of the guide rail can be transmitted to the rubber tires directly and the traveling performance of the rubber tires becomes worse.

Further, in the bogie disclosed in Patent Document 1 and Patent Document 2, the axle does not turn with the rubber tires and thus the weight on the turning part is light compared to the bogie disclosed in Non Patent Document 1 and thus the load on the guide wheels are reduced. However, the right and left guide frames are separately formed and connected respectively to the kingpin. Therefore, the load on the guide wheels are transmitted to the kingpin via the guide frames and the large load is loaded on the kingpin via the guide frames. Therefore, the kingpin and the bearing for supporting the kingpin are subject to breakage. When the kingpin is worn away or when there is misalignment between the kingpin and the bearing, the running stability deteriorates and the height of the guide wheels and the distance between the guide wheels in the width direction of the vehicle change, thereby requiring more maintenance of the axle.

Furthermore, when the guide wheels receive irregular external force, it can cause not only the breakage of the guide wheels and the guide frames but also the breakage of the kingpin, which is the most important component of the vehicle to operate the vehicle.

To improve the cornering performance of the vehicle, the king pin is arranged with a negative camber angle so that the bottom of the wheel is father out of the top. This causes the guide wheels to move in a vertical direction when steering and thus it is necessary to provide a greater width of the guide rail in the vertical direction of the vehicle.

Further, the movement of the guide wheels due to the uneven surface of the guide rail is directly transmitted to the rubber tires, thereby affecting the traveling of the rubber tires and making the traveling unstable. Thus, it is necessary to improve the precision of the guide rail.

RELATED ART DOCUMENT

Patent Document

[Patent Document 1] JP11-278004A (FIG. 4)
[Patent Document 2] JP2003-146204A (FIG. 4 to FIG. 6)

Non-Patent Document

[Non-Patent Document 1] March 1999 issue of "Railroad Vehicles and Technique" published in 1999, pp. 9-19

SUMMARY OF THE INVENTION

In view of the above issues of the related art, an object of the present invention regarding a bogie for a vehicle of a guide rail type, particularly a bogie used for a vehicle of a new transportation system using rubber tires, is to improve the durability of the bogie and to obtain the stable traveling performance thereof without being affected by an uneven surface of a guide rail by reducing the load on guide wheels and enhancing the rigidity of a bogie components such as a guide frame.

To achieve the object of the present invention, the present invention proposes a bogie for a vehicle of a guide rail type which is guided by guide wheels that rotate while keeping contact with a guide rail arranged along a traveling path of the vehicle, the bogie comprising: a steering mechanism which operates in conjunction with the guide wheels so as to steer running wheels; and a guide frame which includes a pair of traverse beams each of which is equipped with the guide wheels rotatably on both ends thereof and a connecting member which connects the pair of the traverse beams with each other, the traverse beams being respectively arranged on a front side and a rear side of the bogie, wherein the guide frame is supported on a non-turning part of the bogie such that the guide frame can turn freely, and the steering mechanism is connected to the guide frame via a connection rod so as to move the steering mechanism in conjunction with the guide frame and steer the running wheels.

When the vehicle advances into a curved section or a switch section of the guideway, the reaction force from the guider rail is exerted on the guide wheels sequentially from the front side to the rear side. In the present invention, with the above structured of the guide frame, the strength of the guide frame is improved in comparison with a cantilever structure receiving the reaction force from the guide rail.

Among the components of the bogie, only the guide frame and the drive tires can turn. In contrast, the bogie of Non-Patent Document 1 is steered by turning the whole structure of the bogie. In comparison to the conventional bogie, the bogie of the preferred embodiment is advantageous in the reduced weight of the turning part. Therefore, the inertial force generated at the turning part can be reduced and the load on the guide wheels from the guide rail is also reduced, thereby improving the durability of the guide wheels.

Moreover, the guide frame is supported on the non-turning part of the bogie turnably and the guide frame and the kingpins are not integrally connected. Thus, the load on the guide wheels from the guide rail is not exerted on the kingpins via the guide frame.

Therefore, the kingpins and bearing parts supporting the kingpins are not subjected to friction or prone to breakage.

Moreover, the movement of the guide wheels rolling against the uneven surface of the guide rail is not directly transmitted to the running wheels. Thus, the uneven surface of the guide rail does not have an adverse effect on traveling of the running wheels. The steering mechanism is connected to the guide frame via the connection rod so that the running wheels are steered by the steering mechanism which moves in conjunction with the guide frame. As a result, the steering performance of the running wheels is enhanced, thereby improving the running stability.

The guide frame may be supported on a circular or arc-shaped turning bearing, thereby simplifying a guide structure for guiding the bogie along the guide rail, and further reducing the number of parts. As a result, it becomes easier to conduct maintenance and the maintenance expense can be reduced.

The guide frame is supported on the non-turning part of the bogie via the circular or arc-shaped turning bearing so that a suspension unit of the bogie has the same structure as the conventional one. Therefore, it is compatible with the conventional structure and thus, it is easy to upgrade the conventional structure of the bogie with the structure of the present invention.

The non-turning part may include an axle or a supporting member of the axle. By installing the guide frame on the axle or the supporting member of the axle via the circular or arc-shaped bearing, the mounting strength of the guide frame is increased and the guide frame can be installed firmly in the non-turning part in a horizontal direction.

In the present invention, it is preferable as a first example structure of the steering mechanism that the steering mechanism includes: a tie rod arranged between kingpins of the running wheels via tie rod arms to transmit a steering angle of the running wheels; and a steering arm being connected to one of the king pins at one end and to the guide frame at the other end.

With the above structure of the steering mechanism, the steering performance of the running wheels is further enhanced in comparison with the structure of Non-Patent Document 1 in which the guide frame, the axle and the rubber tires are rigidly coupled, or the case of Patent Document 1 or 2 in which the guide frame, the kingpins and the rubber tires are integrally connected.

In the present invention, it is also preferable as a second example structure of the steering mechanism of the running wheels that the steering mechanism includes a tie rod arranged between kingpins of the running wheels via tie rod arms to transmit a steering angle of the running wheels, the tie rod being divided into two separated rods at a divisional portion thereof, and the steering mechanism is constituted of a link mechanism in which the two separated rods are connected to the guide frame via the division portion. By this, the steering performance is enhanced in the same manner as the first example structure.

The first and second example structure uses a link mechanism of Ackerman steering. The relationship of the kingpins and the tie rod arms and tie rod, is such that the rubber tires on an inner side and the rubber tires on an outer side of the curved guideway are respectively directed to a tangential direction when passing the curved portion of the guideway. By this, uneven abrasion of the running wheels is prevented and the running resistance at the curved portion of the guideway is reduced without causing unwanted slip angle.

In the first example structure, the steering angle is transmitted with a slight difference in the steering angle between the rubber tires on the inner side of the curved guideway and the rubber tires on the outer side of the curved guideway. In contrast, in the second example structure, the movement of the guide frame is transmitted to the right and left kingpins via the separated rods, and thus the steering angle is transmitted without generating the slight difference in the steering angle from the rubber tires on the inner side of the curved guideway to the rubber tires on the outer side of the curved guideway. Therefore, the load is evenly transmitted on the right and left rubber tires, and thus the rubber tires become worn evenly.

In the first and second example structures, it is preferable to arrange the tie rod closer to a center side of the vehicle body than an axle in a longitudinal direction of the vehicle body.

When the tie rod is disposed closer to the edge side of the vehicle body than the axle is disposed, it is necessary to make the tie rod longer than the distance between the right and left kingpins mounted on the axle in order to apply the Ackerman link mechanism to the trapezoidal link mechanism formed by the axle, tie rod arms and the tie rod. Therefore, the tie rod is interfered by the guide wheels and the disposition of the tie rod becomes difficult.

When the tie rod is arranged closer to a center side of the vehicle body than the axle of the running wheels in the longitudinal direction of the vehicle body, the tie rod simply needs to be shorter than the distance between the right and left kingpins on the axle. In this manner, no interference is caused to the disposition of the tie rod and the running wheels. As a result, the disposition of the tie rod becomes easier.

In the present invention, the guide wheels may be arranged so that a distance between outer edges of the guide wheels on a center side of the vehicle body in a longitudinal direction is smaller than a distance between outer edges of the guide wheels on an edge side of the vehicle body in the longitudinal direction.

With the above structure, in manner similar to such a case that the guide wheels are provided for the front side or the rear side of the bogie, unrestricted turning motion of the bogie can be achieved in the amount corresponding to the reduced distance. Therefore, the turning reaction force acting on the guide wheels can be reduced with an instantaneous movement when the vehicle reaches the deformed sections of the guideway such as the curved section and the unpaved section or receives a disturbance.

Further, it is also preferable in the present invention that the guide wheels disposed on a center side of the vehicle body in a longitudinal direction have a rigidity less than the guide wheels arranged on an edge side of the vehicle body in the longitudinal direction. By this, the reaction force from the guide rail can be absorbed by deflection of the guide wheels on the center side, and thus in the same manner as the aforementioned structure, the reaction force exerted on the guide wheels from the guide rail is reduced with an instantaneous movement.

Furthermore, it is also preferable in the present invention that a turning center of the guide frame is displaced with respect to a center of the axle toward the edge side of the vehicle body when the bogie is installed on the front side or rear side of the vehicle body in the traveling direction.

With the structure, when the vehicle travels through the curved guideway, the running wheels are given a slip angle by the angle corresponding to the displacement amount with respect to a direction of the tangent to the curved guideway by the steering mechanism moving in conjunction with the guide wheels. As a result, the cornering force is exerted in the direction perpendicular to the traveling direction of the vehicle.

Thus, the reaction force from the guide rail on the guide wheels on the outer side of the curved guideway is reduced in the front bogie by the cornering force directing toward the inner side of the curved guideway. ON the other hand, in the rear bogie, the reaction force on the guide wheels on the inner side of the curved guideway is reduced by the cornering force directing toward the outer side of the curved guideway.

In this manner, the durability and life of the guide wheels can be enhanced and the running wheels are insusceptible to the effect of the disturbance caused by the unpaved or uneven surface of the guide rail when the vehicle passes through the curved guideway. As a result, the running performance becomes more stable.

The turning center of the guide frame is displace with respect to the center of the axle toward the edge side of the vehicle body. And thus, in the front bogie of the vehicle body, the running stability is enhanced by the trailing effect.

Further, the bogie of the present invention may preferably further comprises a restoring device for applying to the guide frame a restoring force that directs the guide wheels in a straight direction, and a damper for suppressing a drastic turning movement of the guide frame. By the restoring device, the running stability of the vehicle traveling at a high speed is improved and at the same time, excessive movement of the bogie in the turning direction is restricted by the damper. As a result, the bogie is kept from being in a vibration state.

Furthermore, it is also preferable that the bogie further comprises a shock absorber of a spring type or a rubber type arranged on the guide frame and absorbing impact loaded on the guide wheels from the guide rail. The shock absorber absorbs the impact on the guide wheels when the vehicle reaches the curved section or the switch section or when there is an uneven surface or bump on the guide rail. By this, the bogie structure such as the guide wheels and the guide frame are prevented from breakage and abrasion, and also the ride quality of the vehicle is maintained.

According to the present invention, the bogie for the vehicle of the guide rail type which is guided by the guide wheels that rotate while keeping contact with the guide rail arranged along the traveling path of the vehicle, the bogie comprising: a steering mechanism which operates in conjunction with the guide wheels so as to steer running wheels; and a guide frame which includes a pair of traverse beams each of which is equipped with the guide wheels rotatably on both ends thereof and a connecting member which connects the pair of the traverse beams with each other, the traverse beams being respectively arranged on a front side and a rear side of the bogie, wherein the guide frame is supported on a non-turning part of the bogie such that the guide frame can turn freely, and the steering mechanism is connected to the guide frame via a connection rod so as to move the steering mechanism in conjunction with the guide frame and steer the running wheels. Therefore, the strength of the guide frame is enhanced and the load on the guide wheels is reduced by reducing the weight of the turning part of the bogie. As a result, the durability of the bogie structure including the guide wheels is improved, thereby achieving the long life of the bogie structure.

Further, the king pin is not subjected to high load, thereby preventing the kingpin from breakage, and the movement of the guide wheels are transmitted to the running wheels via the steering mechanism, thereby preventing the guide wheels from directly being affected by the uneven surface of the guide rail. As a result, the running stability and the steering performance of the running wheels are enhanced.

The guide frame is supported on the circular or arc-shaped turning bearing, thereby simplifying the guide structure for guiding the bogie along the guide rail, and further reducing the number of parts. As a result, it becomes easier to conduct maintenance and the guide structure is compatible with the conventional bogie structure by using the same attachment as the conventional bogie structure as the suspension of the bogie is not modified.

DETAILED DESCRIPTION OF THE PREFERRED EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present.

First Preferred Embodiment

Figure 1:
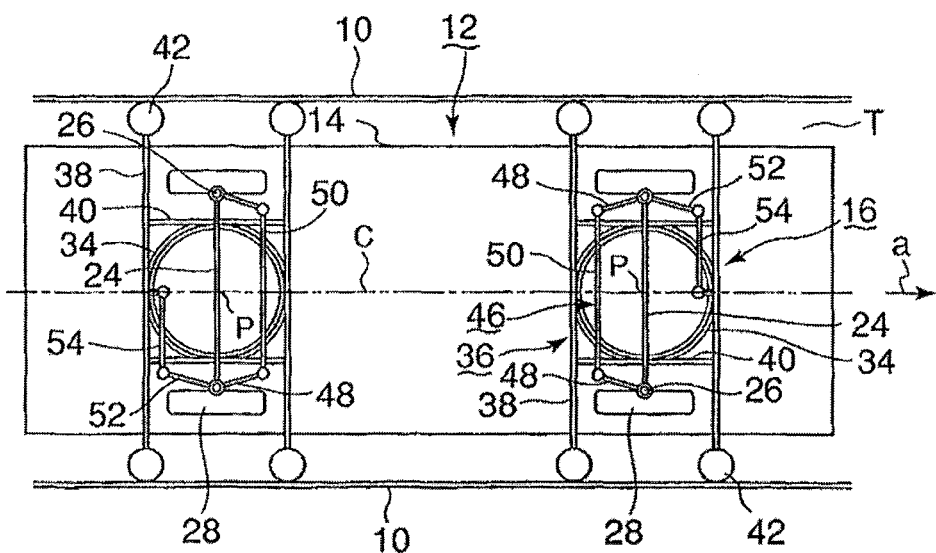
FIG. 1 A plane view of a vehicle of a guide rail type using a bogie of a first preferred embodiment of the present invention.

A vehicle of a guide rail type using bogies of a first preferred embodiment of the present invention will be described in reference to FIG. 1 and FIG. 2. As shown in FIG. 1, in a new transit system, guide rails 10 are disposed along a guideway T on both sides thereof. A vehicle 12 travels along the guideway T. And two bogies 16 are installed on each vehicle 12 on a front part and a rear part thereof. The bogie 16 has guide wheels 42, which rotate along a guide surface of the guide rail 10. The guide wheels 42 guide the vehicle 12 so that the vehicle 12 travels on the guideway T. In FIG. 1, the arrow a indicates the traveling direction of the vehicle 12.

It is also possible to arrange one guide rail in a center of the guideway T to be interposed between the guide wheels mounted on the bogie from both sides thereof. In this way, the guide wheels roll on each side of the guide rail so as to guide the vehicle.

Figure 2:
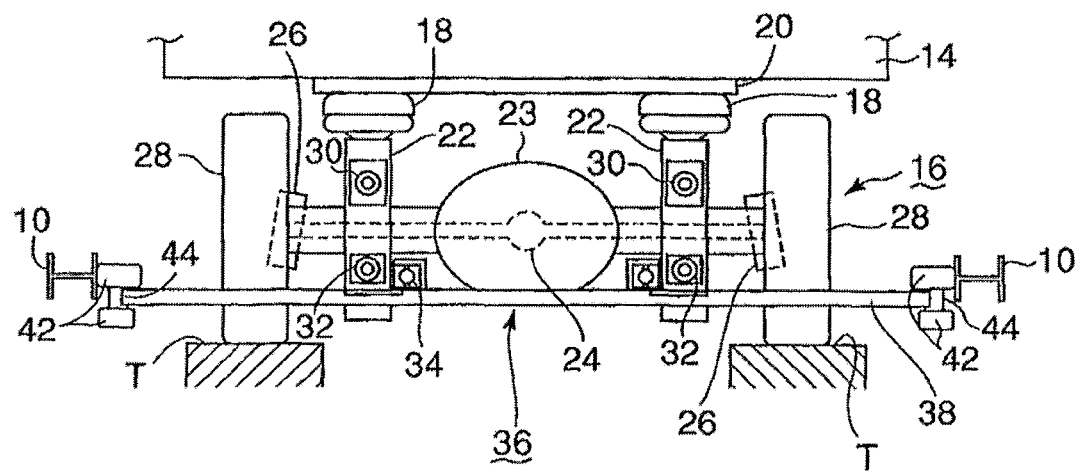
FIG. 2 A side view of the bogie of the first preferred embodiment.

In FIG. 2, the bogie 16 is installed under the vehicle body 14 via air springs 18 for suspension. Specifically, a suspension frame not shown in the drawing is projected under the vehicle body 14. A base 20 of the suspension frame is fixed to a bottom of the vehicle body 14. And the air springs 18 are installed between the base 20 and an axle bearing 22. For each bogie, a pair of the air springs 18 is arranged symmetrically about the center of the vehicle body in the width direction thereof. The axle bearing 22 supports an axle housing 23 horizontally in the width direction of the vehicle body. The axle housing 23 houses a drive shaft 24 and is equipped with rubber tires 28 on both ends thereof via kingpins 26 respectively. The rubber tires 28 are filled with gas and equipped with inner safety wheels.

A pair of upper rods 30 and a pair of lower rods 32 are disposed symmetrically about the center of the vehicle body in the width direction thereof respectively. The upper rods 30 and the lower rods 32 extend in a longitudinal direction of the vehicle body. Upper ends of the upper rods 30 and the lower rods 32 are supported rotatably on the suspension frame not shown in the drawing while lower ends of the upper rods 30 and the lower rods 32 are supported rotatably on the axle bearing 22. In this manner, the upper rods 30 and the lower rods 32 form a parallel link mechanism so as to support the axle bearing 24 to move parallel in a vertical direction.

A circular turning bearing 34 has a stationary part which is fixed to a lower part of the axle bearing 22. A movable part of the circular turning bearing 34 is fixed to the guide frame 36.

As illustrated in FIG. 1, the guide frame 36 forms a lattice structure formed by two traverse bars 38 that are arranged on outer sides of the rubber tires 28 in the longitudinal direction and extend in the width direction of the vehicle body, and two connecting bars 40 installed between the pair of the traverse bars 38 to connect the traverse bars 38. The guide wheel is mounted rotatably on each end 44 of the traverse bars 38. In this manner, a non-turning part of the bogie 16 is formed by the axle housing 22 and the axle housing having the drive shaft 24 therein while a turning part of the bogie 16 is formed by the guide frame 36 and the guide wheels 42.

In the preferred embodiment, a turning center P of the guide frame 36 is disposed on the intersection point of a longitudinal center line C of the vehicle 12 and a axis line of the axle housing 23.

Now, the steering mechanism of the bogie 16 of the preferred embodiment is explained hereinafter. In FIG. 1, the steering mechanism 46 includes a pair of tie rod arms 48 being connected to the kingpins 26 of the pair of the rubber tires 28, a tie rod 50 connected to the tie rod arms 48 such as to move rotationally with respect to the tie rod arms 48, a steering arm 52 connected to one of the kingpins 26, and a connection rod 54 connected to the steering arm 52 such as to move rotationally with respect to the steering arm 52. The connection rod 54 is connected to the traverse bar 38 of the guide frame 36.

With the structure of the preferred embodiment, the guide wheels 42 roll against one side of the guide rail 10 so that the vehicle 12 travels on the guideway T. While traveling, the guide wheels 42 receive reaction force from the guide rail 10, which is then transmitted to the guide frame 36. The reaction force causes the guide frame 36 to turn and thus the vehicle 12 travels along the curved portion of the guideway T.

The guide frame 36 turns, thereby operating the steering arm 52 via the connection rod 54. As a result, the rubber tires 28 are steered by the steering mechanism 46.

When the vehicle 12 advances into a curved section or a switch section of the guideway T, the reaction force from the guide rail 10 is loaded on the guide wheels 42 sequentially from the front side to the rear side. In this preferred embodiment, with the lattice structure of the guide frame 36 formed by the traverse bars 38 and the connection bars 40, the strength of the guide frame is improved in comparison with a cantilever structure receiving the reaction force from the guide rail.

Further, among the components of the bogie, only the guide wheels 42, the guide frame 36, and the rubber tires 26 can turn. In contrast, the bogie of Non-Patent Document 1 is steered by turning the whole structure of the bogie. In comparison to the conventional bogie, the bogie of the preferred embodiment is advantageous in the reduced weight of the turning part. Therefore, the inertial force generated at the turning part can be reduced and the load on the guide wheels 42 from the guide rail 10 is also reduced, thereby improving the durability of the guide wheels 42.

Furthermore, the guide frame 36 is supported on the non-turning part of the bogie turnably via the circular turning bearing 34. The guide frame 36 and the kingpins 26 are not integrally connected and thus, the load on the guide wheels 42 from the guide rail 10 is not transmitted to the kingpins 26 via the guide frame 36. Therefore, the kingpins 26 and bearing parts supporting the kingpins 26 are not subjected to wear or prone to breakage.

Moreover, the movement of the guide wheels 42 rolling against the uneven surface of the guide rail 10 is not directly transmitted to the rubber tires 28. Thus, the uneven surface of the guide rail 10 does not have an adverse effect on traveling of the rubber tires 28. The steering mechanism 46 is interposed between the guide frame 36 and the rubber tires 28 so that the rubber tires 28 are steered by the steering mechanism 46 moving in conjunction with the guide frame 36. As a result, the steering performance of the rubber tires 28 is enhanced.

The guide frame 36 is supported on the circular turning bearing 34, thereby simplifying a guide structure for guiding the bogie 16 along the guide rail 10, and further reducing the number of parts. As a result, it becomes easier to conduct maintenance and the maintenance expense can be reduced.

The guide frame 36 is supported on the non-turning part of the bogie via the circular turning bearing 34 so that a suspension unit of the bogie, i.e. the suspension frame not shown, the upper rods 30 and the lower rods 32) has the same structure as the conventional one. Therefore, it is compatible with the conventional structure and thus, it is easy to upgrade the conventional structure of the bogie with the structure of the present invention.

Further, the turning bearing 34 is fixed to the axle bearing 22 and thus, it is possible to install the guide frame 36 firmly on the non-turning part in a horizontal direction.

With the above structure of the steering mechanism 46, the steering performance of the running wheels is further enhanced in comparison with the structure of Non-Patent Document 1 in which the guide frame, the axle and the rubber tires are rigidly coupled, or the case of Patent Document 1 or 2 in which the guide frame, the kingpins and the rubber tires are integrally connected.

Furthermore, the steering mechanism 46 includes a link mechanism of Ackerman steering by which the rubber tires on an inner side and the rubber tires on an outer side of the curved guideway are respectively directed to a tangential direction when passing the curved portion of the guideway. By this, uneven abrasion of the running wheels is prevented and the running resistance at the curved portion of the guideway is reduced without causing unwanted slip angle.

In the preferred embodiment, the tie rod 50 is arranged closer to a center side of the vehicle body than the drive shaft 24 in the longitudinal direction of the vehicle body. By simply making the tie rod 50 shorter than the drive shaft 24, it causes no interference to the disposition of the tie rod 50 and the rubber tires 28. As a result, the disposition of the tie rod 50 becomes easier.

In the first preferred embodiment, the guide wheels may be arranged in the front bogie or the rear bogie in such manner that a distance between outer edges of the guide wheels on a center side of the vehicle body in a longitudinal direction is smaller than a distance between outer edges of the guide wheels on an edge side of the vehicle body in the longitudinal direction. Similar to such a case that the guide wheels are provided for only one of the traverse beams 38, unrestricted turning motion of the bogie 16 can be achieved in the amount corresponding to the reduced distance. Therefore, the turning reaction force acting on the guide wheels can be reduced with an instantaneous movement when the vehicle passes the changing sections of the guideway T such as the curved section and the uneven section or receives a disturbance.

Alternatively, the guide wheels disposed on a center side of the vehicle body in a longitudinal direction have a rigidity less than the guide wheels arranged on an edge side of the vehicle body in the longitudinal direction. By this, the turning reaction force acting on the guide wheels 42 from the guide rail 10 can be reduced with an instantaneous movement in the amount of deflection of the guide wheels on the center side.

Second Preferred Embodiment

Figure 3:
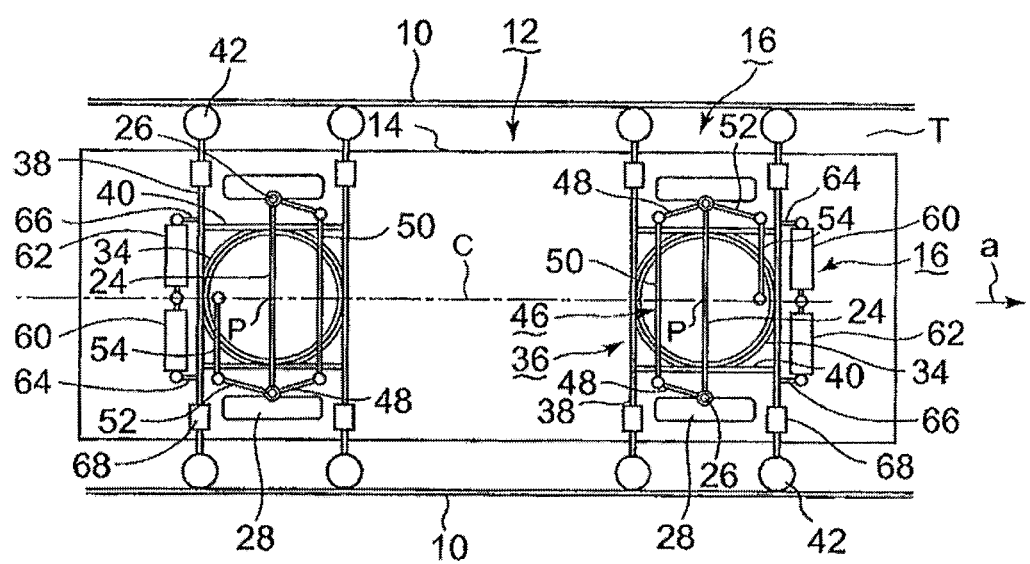
FIG. 3 A plane view of a vehicle of a guide rail type using a bogie of a second preferred embodiment of the present invention.

Next, a second preferred embodiment will be explained in reference to FIG. 3. In FIG. 3, the structure of the bogie is the same as the first preferred embodiment except for the following. Specifically, the bogie comprises a restoring rod 60 for applying to the guide frame a restoring force that directs the guide wheels in a straight direction, and a turning damper 62 for suppressing a drastic turning movement of the guide frame. The restoring rod 60 and the turning damper 62 are mounted on the traverse bar of the edge side of the vehicle parallel thereto via the connecting rods 64 and 66.

The restoring rod 60 is structured such that a spring element and a shock-absorbing mechanism of a damping element are connected. The restoring rod 60 applies the force in the direction to restore the guide frame 36 in a neutral position in which the rubber tires 28 are in a straight advancing state. For instance, JP2-210150A shows an example of the rod. The turning damper 62 can be, for instance, a hydraulic damper.

A shock-absorbing rod 68 is installed near the guide wheels 42 mounted on the traverse bar 38. The structure of the shock-absorbing rod 68 is already known. For instance, the shock absorbing rod 68 has an resilient member inside such as a shock absorbing rubber and when the load is loaded in the axial direction of the traverse bar 38, the shock absorbing rod 68 expands and contract to absorb the shock loaded on the traverse bar 38 from the guide rail 10 (ref. FIG. 3 of Patent Document 1). The shock absorbing rubber can be replaced with a coil spring or the like.

The rest of the structure of the bogie is the same as the first preferred embodiment and the same components are given the same reference numbers and will not be explained further.

According to the preferred embodiment, in addition to the function effect obtained in the first embodiment, the following effect can be obtained as well. Specifically, the stable traveling performance of the vehicle can be achieved during the high speed operation by the restoring rod 60 by applying the restoring force to direct the vehicle 12 in the straight forwarding direction, and excessive movement of the bogie in the turning direction can be restricted by the turning damper 62 and the bogie is prevented from being in a vibrational state.

Moreover, the shock-absorbing rod 68 is provided so as to absorb the impact on the guide wheels 42 when the vehicle reaches the curved section or the switch section or when there is an uneven surface or bump on the guide rail 10. By this, the bogie structure such as the guide wheels 42 and the guide frame 36 are prevented from breakage and abrasion, and also the ride quality of the vehicle 12 is maintained.

Third Preferred Embodiment

Figure 4:
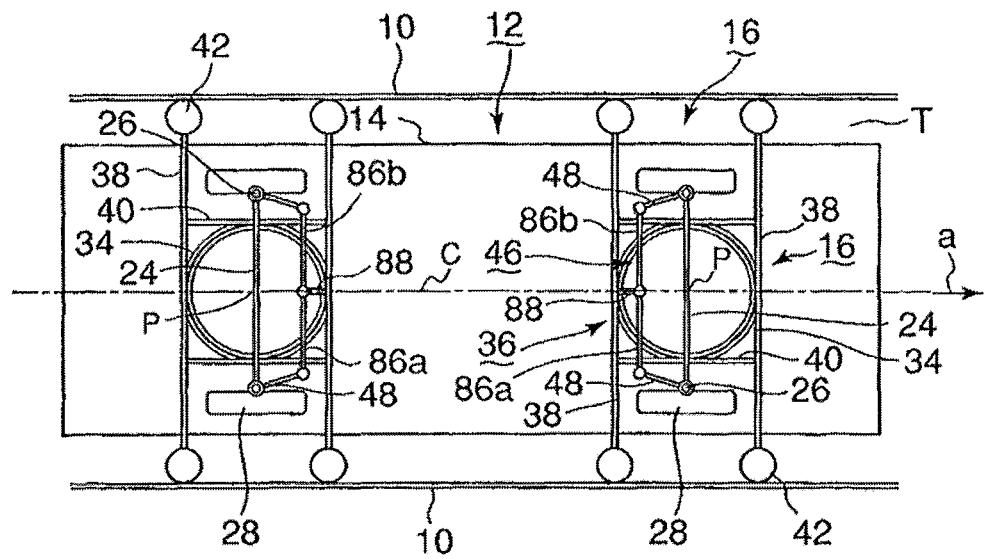
FIG. 4 A plane view of a vehicle of a guide rail type using a bogie of a third preferred embodiment of the present invention.

Next, a third preferred embodiment of the present invention will be described in reference to FIG. 4. The steering mechanism 46 of the third preferred embodiment has a different structure from that of the first preferred embodiment as described below. Specifically, the tie rod 50 of the steering mechanism 46 is divided into two separated rods 86*a* and 86*b* at a center thereof in the axial direction thereof. The tie rod 50 is disposed closer to the center of the vehicle body in the longitudinal direction than the drive shaft 24 in the manner similar to the first preferred embodiment. The separated rods 86*a* and 86*b* are connected rotationally at a connection point. The connection point is connected to a receiving rod 88 projecting from the traverse bar 38 of the center side in the longitudinal direction of the vehicle body.

In this manner, the turning movement of the guide frame 36 is directly transmitted to the kingpins 26 of the rubber tires 28 via the receiving rod 88 and the separated rods 86*a* and 86*b* so as to steer the rubber tires 28. The steering arm 52 and the connection rod 54 of the first preferred embodiment are not used in the third preferred embodiment. The rest of the structure is the same as the first preferred embodiment.

According to the preferred embodiment, the steering mechanism 46 is equipped with a link mechanism of Ackerman steering in the manner similar to the first preferred embodiment and further, the turning movement of the guide frame 36 is directly transmitted to the right and left rubber tires 28. As a result, the steering angle is transmitted without generating a slight difference in the steering angle between the rubber tires 28 on the inner side of the curved portion and the rubber tires 28 on the outer side of the curved guideway. Therefore, when the vehicle travels through the curved guideway, the load is evenly transmitted on the rubber tires 28, and thus the rubber tires 28 become worn evenly.

Fourth Preferred Embodiment

Figure 5:
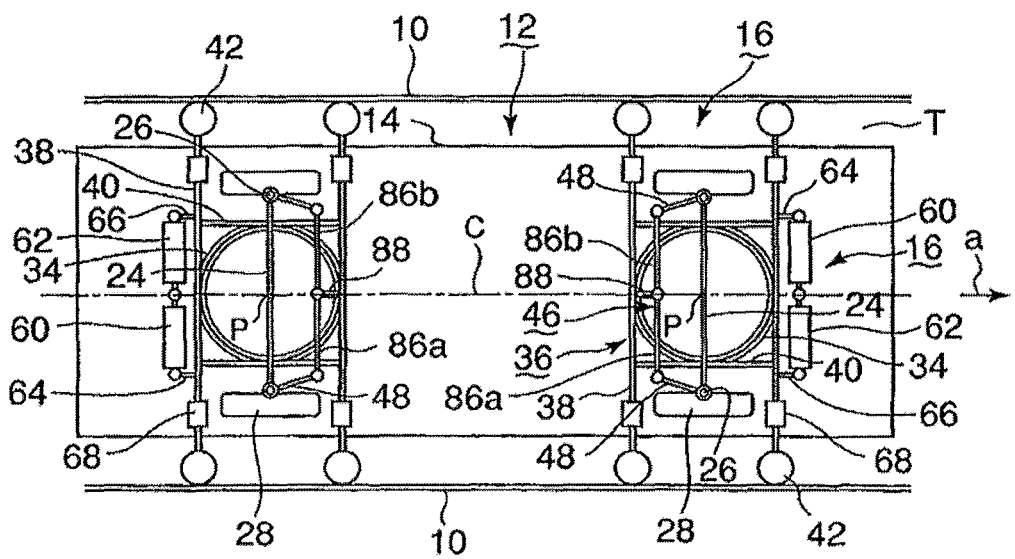
FIG. 5 A plane view of a vehicle of a guide rail type using a bogie of a fifth preferred embodiment of the present invention.

Next, a fourth preferred embodiment of the present invention is described in reference to FIG. 5. In the preferred embodiment in the same manner as the second preferred embodiment, the connecting rod 64, the restoring rod 60, the turning damper 62 and the shock-absorbing rod 68 are provided in the bogie.

In addition to the function effect obtained in the third preferred embodiment, the guide wheels can be directed in the straight direction by the restoring rod 60, the turning movement in the turning direction is restricted by the turning damper 52 and the impact loaded on the guide wheels from the guide rail is absorbed by the shock absorbing rod 68.

Fifth Preferred Embodiment

Figure 6:
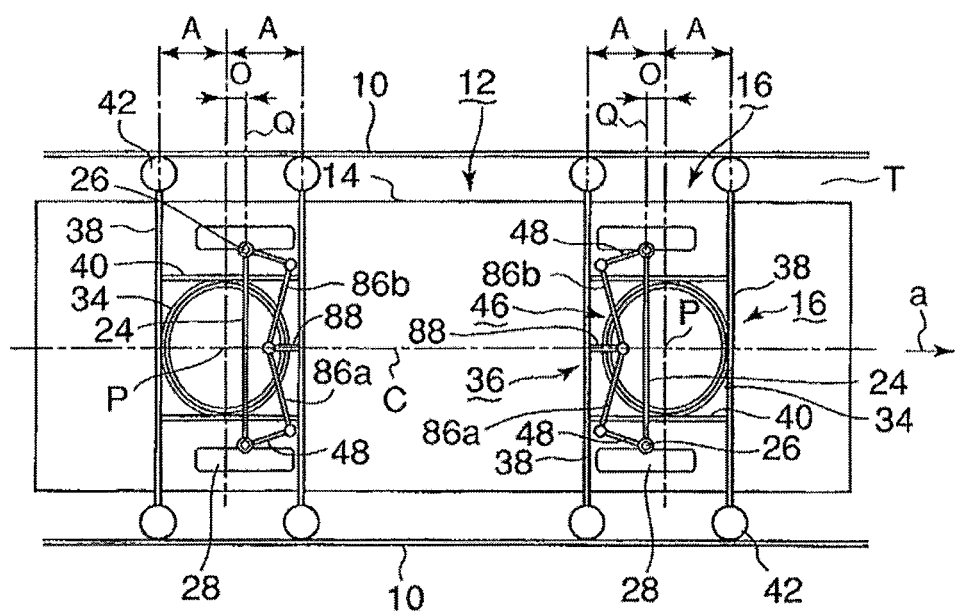
FIG. 6 A plane view of a vehicle of a guide rail type using a bogie of a fourth preferred embodiment of the present invention.

Next, a fifth preferred embodiment of the present invention will be described in reference to FIG. 6 and FIG. 7. In the fifth preferred embodiment, in the bogie 16 of the third preferred embodiment illustrated in FIG. 6, a turning center P of the guide frame 36 is displaced by a distance O with respect to a center Q of the drive shaft 24 toward the edge side of the vehicle body in the front and rear bogies 16. The rest of the structure is the same as the third preferred embodiment.

Figure 7:
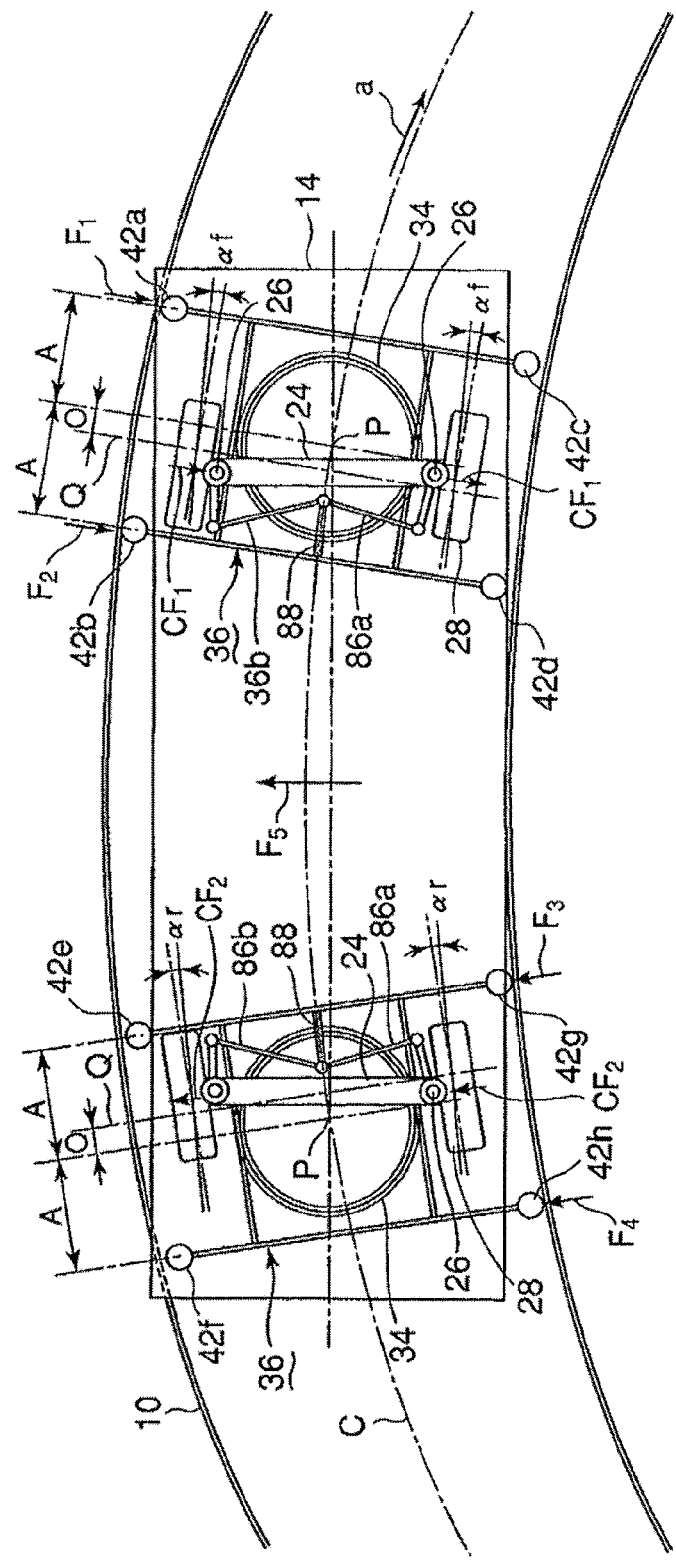
FIG. 7 A plane view of the bogie of the fifth preferred embodiment traveling on a curved guideway.

FIG. 7 illustrates the vehicle 12 of the preferred embodiment passing the curved portion of the guideway. In FIG. 7, the bogie 16 is subjected to excess centrifugal load $F_5$ which is centrifugal force on the bogie 16 minus the amount reduced by a cant. Thus, the reaction force from the guide rail 10 is loaded on the guide wheels 42a and 42b against the excess centrifugal load $F_5$.

Meanwhile, the turning center P of the guide frame 36 is displaced by the distance O with respect to the center Q of the axle toward the edge side of the vehicle and thus, when the vehicle 12 travels through the curved guideway, the rubber tires 28 of the front bogie are directed toward the center of the curved guideway by the angle $\alpha_f$ with respect to a direction of the tangent to the curved guideway at the center Q of the drive shaft 24. Therefore, the rubber tires are given a slip angle and the cornering force $CF_1$ is generated in the direction toward the inside of the curved guideway.

By this, the reaction forces exerted on the front and rear guide wheels 42a and 42b on the inner side of the curve are reduced against the centrifugal force and thus the durability of the guide wheels 42a and 42b can be improved.

Further, the distance (A+O) between the front guide wheels 42a and rubber tire 28 is greater than the distance (A−O) between the guide wheels 42b of the center side and the rubber tire 28. Thus, the reaction force exerted on the front guide wheels 42a becomes small by lever ratio so as to improve the durability of the guide wheels 42a.

Furthermore, the running stability of the vehicle 12 can be further improved by the trailing effect of the above disposition of the guide frame 36.

In the same manner as the front bogie, the rubber tires 28 of the rear bogie are displaced by the distance O with respect to the center Q of the axle toward the edge side of the vehicle and thus the rubber tires 28 are directed to the outer side of the curved guideway by the angle $\alpha_f$ with respect to a direction of the tangent to the curved guideway at the center Q of the rubber tires. Therefore, the rubber tires 28 are given a slip angle and the cornering force $CF_2$ is exerted in the direction toward the inside of the curved guideway.

Contrary to the case of the front bogie, the reaction force is exerted on the guide wheels 42ga and 42h of the inner side when the vehicle travels on the curved guideway. As the $CF_2$ is exerted in the direction toward inside of the curved guideway, the reaction forces exerted on the guide wheels 42g and 42h on the inner side are reduced and thus the durability of the guide wheels 42g and 42h of the inner side can be improved.

In the preferred embodiment, the reaction force exerted on the guide wheels 42 from the guide rail when the vehicle passes the curved section of the guideway can be calculated as below.

$$\text{Reaction force of front bogie (edge side wheels), } F_1 = \text{(front guide load)} + \text{(excess centrifugal load/4)} - (2 \times CF_1 \times (A-O)/2A) \quad (1)$$

$$\text{Reaction force of front bogie (center side wheels), } F_2 = \text{(rear guide load)} + \text{(excess centrifugal load/4)} - (2 \times CF_1 \times (A+O)/2A) \quad (2)$$

$$\text{Reaction force of rear bogie (center side wheels), } F_3 = \text{(front guide load)} + \text{(excess centrifugal load/4)} - (2 \times CF_2 \times (A+O)/2A) \quad (3)$$

$$\text{Reaction force of rear bogie (edge side wheels), } F_4 = \text{(rear guide load)} + \text{(excess centrifugal load/4)} - (2 \times CF_2 \times (A-O)/2A) \quad (4)$$

In the formulas, the guide load is a load needed to steer the rubber tires 28 against the each restoring force. And the excess centrifugal load is the excess centrifugal force exerted on the guide wheels 42 minus the amount reduced by the cant.

Sixth Preferred Embodiment

Figure 8:
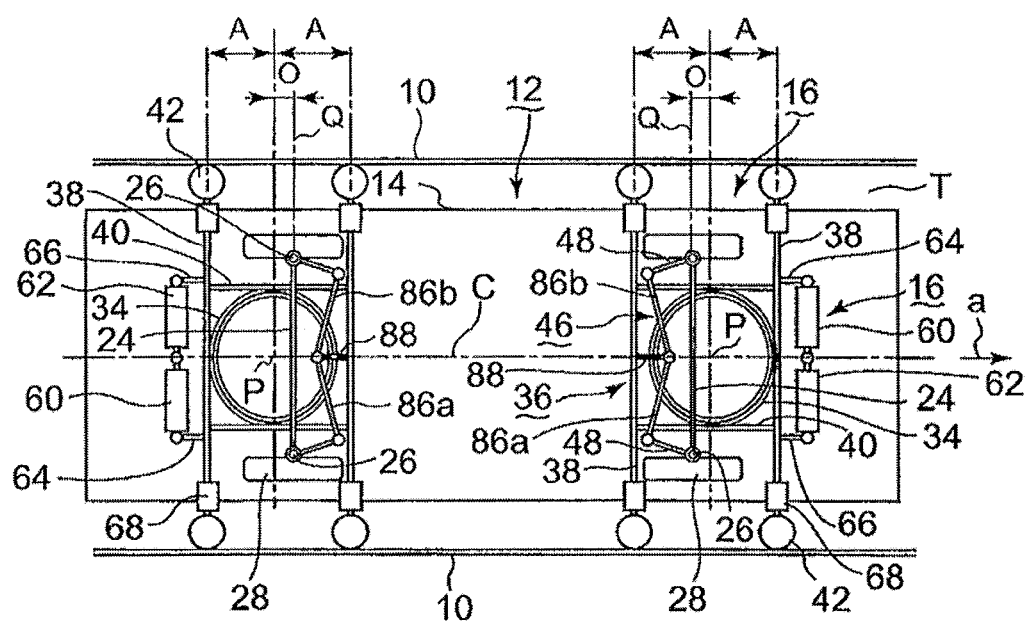
FIG. 8 A plane view of the vehicle of the guide rail type using the bogie of the sixth preferred embodiment of the present invention.

Next, a sixth preferred embodiment of the present invention will be described in reference to FIG. 8. In the preferred embodiment in the same manner as the fifth preferred embodiment, the connecting rod 64 and 66, the restoring rod 60, the turning damper 62 and the shock-absorbing rod 68 are provided in the bogie.

Therefore, in addition to the function effect obtained in the fifth preferred embodiment, the guide wheels can be directed in the straight direction by the restoring rod 60, the turning movement in the turning direction is restricted by the turning damper 62 and the impact loaded on the guide wheels from the guide rail is absorbed by the shock absorbing rod 68.

INDUSTRIAL APPLICABILITY

According to the present invention, in the bogie for the vehicle of the guide rail type, which is equipped with the guide wheels, particularly in the bogie of the new transit system, the durability of the bogie and the running stability of the bogie structure including the guide wheels and the guide frame can be improved.

The invention claimed is:

1. A bogie for a vehicle which is guided by guide wheels that rotate while keeping contact with guide rails arranged on either side of a guideway of the vehicle on which the vehicle travels and disposed along the guideway, the bogie comprising:
a steering mechanism which operates in conjunction with the guide wheels so as to steer running wheels;

a guide frame which includes a pair of traverse bars each of which is equipped with the guide wheels rotatably mounted on both ends of the traverse bars and which are arranged on a front side and a rear side of the running wheels in a longitudinal direction of the vehicle body and extend in a width direction of the vehicle body, and connecting bars which are installed between the pair of the traverse bars and connect the pair of the traverse bars with each other;

a connection part connecting directly a rod member of the steering mechanism to one of the traverse bars of the guide frame so as to move the steering mechanism in conjunction with the guide frame and steer the running wheels; and a circular turning bearing having a circular or an arc shape to rotatably support the guide frame on an axle of the bogie or a supporting member of the axle.

2. The bogie for the vehicle according to claim 1, wherein the steering mechanism includes:

a tie rod arranged between kingpins of the running wheels via tie rod arms to transmit a steering angle of the running wheels; and a steering arm being connected to one of the kingpins at one end and to the guide frame at the other end.

3. The bogie for the vehicle according to claim 1, wherein the steering mechanism includes a tie rod arranged between kingpins of the running wheels via tie rod arms to transmit a steering angle of the running wheels, the tie rod being divided into two separated rods at a divisional portion of the tie rod, wherein the steering mechanism is constituted of a link mechanism in which the two separated rods are connected to the guide frame via the divisional portion.

4. The bogie for the vehicle according to claim 2, wherein the tie rod is arranged closer to a center side of a vehicle body than the axle in a longitudinal direction of the vehicle body.

5. The bogie for the vehicle according to claim 1, wherein the guide wheels are arranged so that a distance between outer edges of the guide wheels on a center side of a vehicle body in a longitudinal direction is less than a distance between outer edges of the guide wheels on an edge side of the vehicle body in the longitudinal direction.

6. The bogie for the vehicle according to claim 1, wherein the guide wheels disposed on a center side of a vehicle body in a longitudinal direction have a rigidity less than the guide wheels arranged on an edge side of the vehicle body in the longitudinal direction.

7. The bogie for the vehicle according to claim 1, wherein a turning center of the guide frame is displaced with respect to a center of the axle toward the edge side of a vehicle body.

8. The bogie for the vehicle according to claim 1, further comprising:

a restoring device for applying to the guide frame a restoring force that directs the guide wheels in a straight direction; and a damper for suppressing a drastic turning movement of the guide frame.

9. The bogie for the vehicle according to claim 1, further comprising:

a shock absorber made of spring or a rubber arranged on the guide frame and absorbing impact loaded on the guide wheels from the guide rail.

10. The bogie for the vehicle according to claim 1, wherein the circular turning bearing comprises:

a stationary part fixed to a lower part of the supporting member; and a movable part fixed to the guide frame.

11. The bogie for the vehicle according to claim 1, wherein the circular turning bearing is disposed between the pair of traverse bars, and contacting the pair of traverse bars and the connecting bars.

12. The bogie for the vehicle according to claim 1, wherein the circular turning bearing has a diameter greater than that of the running wheels.

13. The bogie for the vehicle according to claim 10, wherein the circular turning bearing is disposed between the pair of traverse bars, and contacting the pair of traverse bars and the connecting bars, and the circular turning bearing has a diameter greater than that of the running wheels.

\* \* \* \* \*